Sept. 19, 1950      A. F. KENYON      2,523,120
MOTOR CONTROL SYSTEM
Filed March 8, 1947
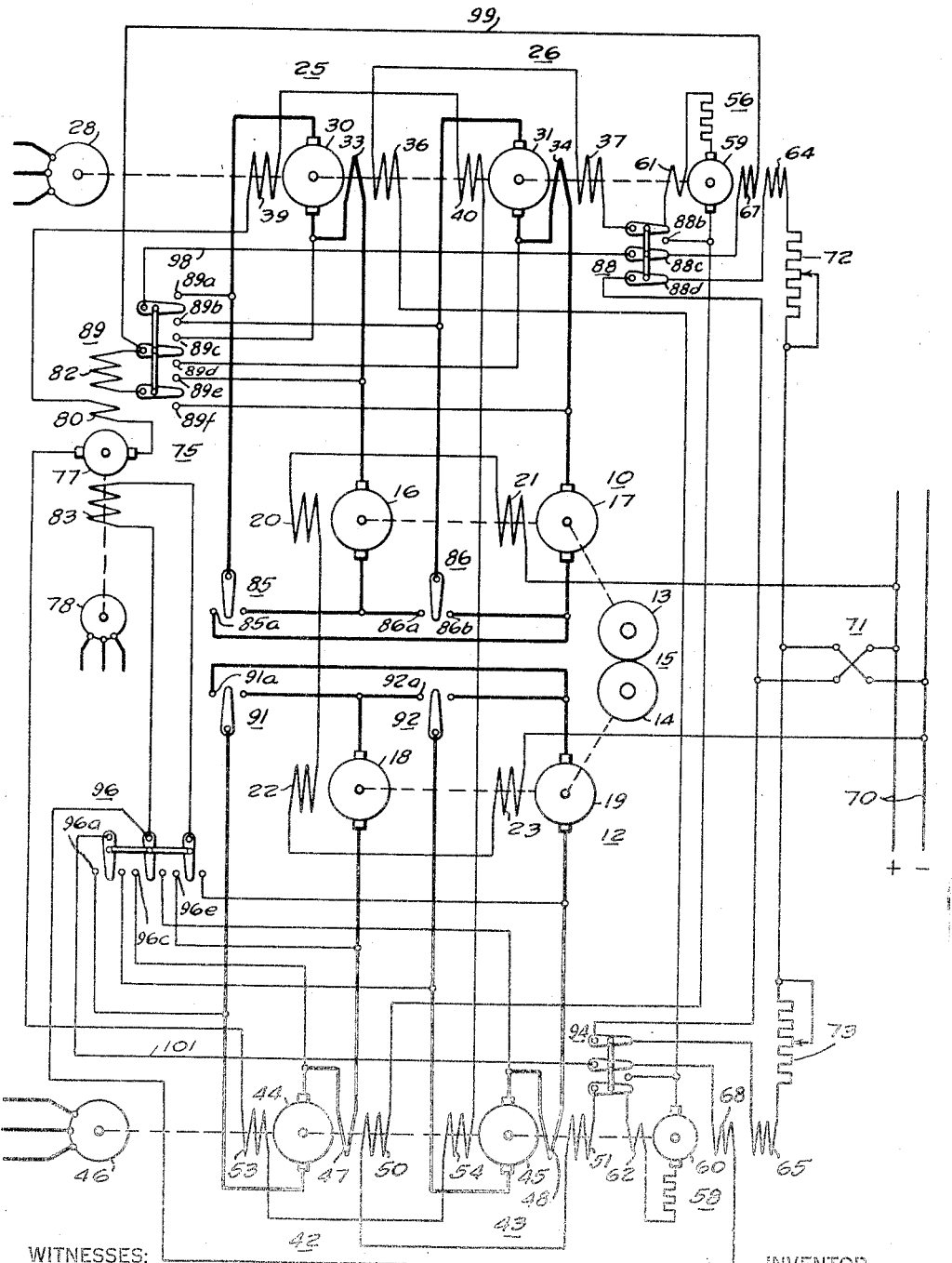
WITNESSES:
INVENTOR
Alonzo F. Kenyon.
BY
ATTORNEY Patented Sept. 19, 1950

2,523,120

UNITED STATES PATENT OFFICE 2,523,120

MOTOR CONTROL SYSTEM

Alonzo F. Kenyon, Pittsburgh, Pa., assignor to Westinghouse Electric Corporation, East Pittsburgh, Pa., a corporation of Pennsylvania Application March 8, 1947, Serial No. 733,269

8 Claims. (Cl. 318—45)

My invention relates, generally, to control systems, and it has reference, in particular, to control systems for twin-motor drives such as may be used for driving the roll stand of a rolling mill, or any other common load of the same general character.

Generally stated, it is an object of my invention to provide a motor control system which is simple and inexpensive to manufacture, and which is reliable and efficient in operation.

More specifically, it is an object of my invention to provide for connecting a plurality of field windings for dynamo-electric machines in sandwiched relation with a plurality of sources of electrical energy.

Another object of my invention is to provide for using a plurality of relatively small, and therefore relatively quick-response, exciters connected in series circuit sandwiched relation with two or more field windings of dynamo-electric machines.

Yet another object of my invention is to provide for utilizing a plurality of generators for separately controlling the energization of a pair of motors driving a common load, and for maintaining a predetermined division of the common load between the motors by using a common load balancing regulating generator for selectively varying the loads of the motors in opposite senses.

It is an important object of my invention to provide a flexible twin-motor drive which may be effectively operated despite failure of a part of the motor, generator, or exciter apparatus.

It is also an object of my invention to provide, in a control system for the motors of a twin-motor drive, for utilizing a single regulating generator having opposed fields which neutralize each other when the loads on the motor are balanced, for balancing the load between the motors.

Other objects will in part be obvious, and will in part be explained hereinafter.

In practicing my invention in one of its forms as it may be applied to rolling mills, the armatures of the upper and lower roll motors of a roll stand may be energized from separate generators which are connected in sandwiched relation therewith. The field windings of the generators are connected in series circuit sandwiched relation with the armatures of a pair of regulating exciters which are responsive to the armature voltages of their respective generators. Load balance or division between the upper and lower roll motors is obtained by means of regulating field windings on their respective generators, which are energized in opposite senses by a common regulating generator, the output of which is determined by means of opposed field windings, which are energized in accordance with the armature currents of the motors.

For a more complete understanding of the nature and scope of my invention, reference may be made to the following detailed description, which may be read in connection with the accompanying drawing, in which the single figure is a diagrammatic view of a motor control system embodying my invention in one of its forms.

Referring to the drawing, the reference numerals 10 and 12 may denote generally a pair of motors which may be connected in driving relation with the upper and lower rolls 13 and 14 of a roll stand 15. The motors 10 and 12 may be of the double armature type having armatures 16, 17 and 18, 19, with associated field windings 20, 21 and 22, 23, respectively.

In order to provide for energizing the armatures 16 and 17 of the motor 10, a pair of generators 25 and 26 may be provided, having driving connections with a motor 28. The generators 25 and 26 may comprise armatures 30 and 31, compensating field windings 33 and 34, main field windings 36 and 37, and regulating field windings 39 and 40, respectively.

In order to provide for energizing the motor armatures 16 and 17 in a most effective manner, the armatures 30 and 31 of the generators 25 and 26 may be connected in series circuit relation with the armatures 16 and 17 being, for example, sandwiched between the armatures 16 and 17 alternately. The compensating field windings 33 and 34 may be connected in series circuit relation with and adjacent to their respective armatures.

The armatures 18 and 19 of the lower roll motor 12 may be energized in a similar manner from a pair of generators 42 and 43, armatures 44 and 45 connected in driving relation with a motor 46, compensating field windings 47 and 48, main field windings 50 and 51, and regulating field windings 53 and 54, respectively. The armatures 44 and 45 of the generators 42 and 43 may be connected alternately with the armatures 18 and 19 of the motor 12, to provide a series circuit sandwiched relation. The compensating field windings 47 and 48 may also be connected in series circuit relation with and adjacent to their respective armatures.

In order to provide for controlling the outputs of the generators 25, 26 and 42, 43, the main field windings 36, 37 and 50, 51 thereof may be connected to a suitable variable voltage source. To provide a reliable and efficient source of electrical energy for controlling the energization of these main field windings, a pair of regulating exciters 56 and 58 may be utilized. These exciters may comprise armatures 59 and 60, having driving connections with the motors 28 and 46, respectively, and having self-energizing field windings 61 and 62 connected in series circuit relation therewith. The exciters may also be provided with pattern field windings 64 and 65, and opposing control field windings 67 and 68, respectively.

In order to provide a relatively quick-response and flexible excitation system for the main field windings of the main generators, the armatures 59 and 60 of the regulating exciters may be connected in series circuit relation with the field windings 36, 37 and 50, 51 alternately, so as to be sandwiched therebetween. The pattern field windings 64 and 65 may be connected to a suitable source of electrical energy such as the control bus conductors 70, through a reversing switch 71. Rheostats 72 and 73 may be provided for controlling the energization of the pattern field windings 64 and 64, respectively.

The control field windings 67 and 68 may be connected in opposed relation to their respective pattern field windings so as to neutralize the effects thereof, when the voltages of their respective generators reach predetermined operating values. The control field windings 67 and 68 may, therefore, be arranged for connection across the armatures of one or the other of their respective generators 25, 26 and 42, 43.

In order to provide for maintaining the proper division of the total load between the upper and lower roll motors 10 and 12, means such as the load balancing regulating generators 75 may be utilized. The generator 75 may comprise an armature 77 connected in driving relation with a suitable motor 78, and connected in series circuit relation with a self-energizing series field winding 80 and the regulating field windings 39, 40, 54 and 53 of the main generators. The generators 75 may be provided with opposed field windings 82 and 83 which may be energized in accordance with the armature currents of the roll motors 10 and 12 respectively.

The armature 77 may be so connected, that if the motor 10 is taking greater than its share of the load, the regulating field windings 39 and 40 of the generators 25 and 26 will be energized differentially with respect to the main field windings 36 and 37, so as to reduce the voltage applied to the motor 10, and thus reduce its load. At the same time, the regulating field windings 53 and 54 of the generators 42 and 43 will be energized cumulatively with respect to the main field windings 50 and 51, so as to increase the voltage applied to the roll motor 12, and thus increase its load.

In order to provide a flexible control system switches 85 and 86 may be provided for either connecting both of the motor armatures 16 and 17 in series circuit sandwiched relation with the generator armatures 30 and 31, or for selectively connecting only the armature 16 in circuit relation with the armature 30, or only the armature 17 in circuit relation with the armature 31. This permits operation of either both of the main generators with both of the upper roll motor armatures, or one or the other of them in connection with its associated motor armature in the event of any failure in connection with either of the armatures 16 or 17, or of their associated generator 25 or 26, respectively. A control switch 88 may be provided in connection with the regulating exciter 56 for disconnecting its armature 59, and field windings 67 and 64 in the event of a failure of the exciter 56, or in the event that it is desired for any reason to operate without this exciter. An additional control switch 89 may be provided for selectively connecting the field winding 82 of the load balancing generator 75 in shunt circuit relation with one or the other of the compensating field windings 33 and 34, and the control field winding 67 across the armature 30 or the armature 31, depending upon which of the generators 25 and 26 is being used.

Similar switches 91 and 92 may be provided in connection with the armatures 18 and 19 of the motor 12, for permitting the armatures 18 and 19 to be connected either in series circuit sandwiched relation with the armatures 44 and 45 of the generators 42 and 43, or to permit one or the other of the armatures 18 and 19 to be connected in closed circuit relation with the armature 44 or 45, respectively. A control switch 94 may be provided for disconnecting the armature 60 and the pattern and control field windings 65 and 68 of the regulating exciter 58 in the event it is desired to shut down the exciter 58. An additional control switch 96 may be provided for selectively connecting the field winding 83 of the load balancing generator 75 across, either, the compensating field winding 47, or the field winding 48. The connection of the control field winding 68 of the regulating exciter 58 across either the armature 44 or the armature 45, may also be controlled by the control switch 96.

In normal operation, the switches 85 and 86 may be operated to complete circuits through their contact members 85a and 86a, so as to connect the armatures 30 and 31 of the generators 25 and 26 in series circuit sandwiched relation with the armatures 16 and 17 of the motor 10. The switches 91 and 92 may, likewise, be operated to complete circuits through contacts 91a and 92a, so as to connect the armatures 44 and 45 of the generators 42 and 43 in series circuit sandwiched relation with the armatures 18 and 19 of the motor 12. The switches 88 and 94 may be in the positions shown, while the additional control switches 89 and 96 may be operated to either of their circuit-making positions.

With the switch 89 moved to its upper operating position, the control field winding 67 of the regulating exciter 56 will be connected across the armature 30 of generator 25 through conductor 98 and contact member 89a, and conductor 99 and contact member 89c. With the switch 96 in the left-hand operating position, the control field winding 68 of the regulating exciter 58 will be connected across the armature 44 of generator 42 through conductor 100 and contact member 96c, and conductor 101 and contact member 96a. The field winding 82 of the load balancing generator 75 will be connected across the compensating field winding 33 of generator 25 through contact member 89c and contact member 89e. The opposing field winding 83 will be connected across the compensating field winding 47 of generator 42 through contact member 96e and contact member 96c.

When the reversing switch 71 is operated to connect the pattern field windings 64 and 65 to the control bus conductor 70 for one of the directions of operation, the output voltages of the regulating exciters 56 and 58 are applied to the field windings 36, 37 and 50, 51 of the genwiched relation with the regulating generators, and the motor field windings are shown as energized from a common control bus, it will be realized that the motor field windings may also be connected in such a sandwiched relation, and while the load balancing regulating generator is shown as controlling the generator outputs in accordance with the generator armature currents, it will be realized that this is the same as the motor armature current. Likewise, the regulating generators 56 and 53 may be responsive to the motor armature voltages, instead of the generator armature voltages, without departing from the scope of the invention.

Since certain changes may be made in the above-described construction, and different embodiments of the invention may be made without departing from the spirit or scope thereof, it is intended that all the matter contained in the above-description and shown in the accompanying drawing shall be considered as illustrative and not in a limiting sense.

I claim as my invention:

1. For use with a pair of motors having armatures connected in driving relation with the co-operating work elements of a work device and having field windings energized from a source of electrical energy, a generator for each motor having an armature connected in circuit relation with its associated motor and having a main field winding and a regulating field winding, circuit means connected to energize the main field windings including regulating generators having excitation means connected to be responsive to the output voltages of the generators, and an additional regulating generator having excitation means responsive to the differential between the armature currents of the motors connected to energize the regulating field windings in opposite senses.

2. In a control system for a pair of motors having armatures connected in driving relation with the upper and lower rolls of a roll stand, respectively, and having field windings, a generator associated with each motor having an armature connected in circuit relation with the armature of its associated motor and having a main and a regulating field winding, a pair of exciters connected in series relation and arranged alternately with the main field windings, and a regulating generator having excitation means responsive to the differential between the armature currents connected to energize the regulating field windings in opposite senses.

3. In a control system, a pair of generators having main and regulating field windings, circuit means energizing the main field windings including a pair of exciters having armatures connected alternately between the windings in series circuit sandwich relation with the windings, and a regulating generator differentially responsive to the armature currents of the generators connected to effect energization of the regualting field windings in opposite senses.

4. In an electric drive for a work device having co-operating work elements, a pair of motors having field windings energized from a source of electrical energy and armatures connected in driving relation with said work elements, a main generator for each of the motors having an armature connected in circuit relation with the armature of its associated motor and having main and regulating field windings, a pair of regulating generators having armatures connected in series circuit relation alternately with the main field windings, said regulating generators having pattern field windings and opposing control field windings responsive to voltage conditions of the motor circuits, and a load balancing regulating generator having excitation means responsive to the currents of the motors connected to energize the regulating field windings of the main generators in opposite senses.

5. In a twin-motor drive for a work device having co-operating work elements, a pair of motors each having a field winding and a double armature connected in driving relation with one of the work elements, a pair of generators for each motor, each of said generators having an armature connected in series circuit sandwich relation alternately with the armatures of its associated motor and having main and regulating field windings, and a pair of exciters having excitation means responsive to the generator voltages connected alternately with the main generator field windings in series circuit sandwich relation.

6. In a twin-motor drive for a roll stand having a pair of rolls, a pair of motors having armatures individually connected in driving relation with said rolls, separate pairs of generators having armatures connected in circuit relation with the motor armatures, each of said generators having a main field winding and a regulating field winding, a regulating generator having opposed field windings connected to be responsive to the armature currents of the pairs of generators, said regulating generator being connected to energize the regulating field windings of the pairs of generators in opposite senses, a pair of regulating exciters associated one with each pair of generators and having excitation means responsive to the voltage of one of said pair of generators connected to energize the main field windings of said generators, switch means operable to connect the regulating generator field windings to one or the other generators of the pair, and additional switch means operable to connect the regulating exciters to or disconnect them from circuit relation with the generator field windings.

7. In a control system for a pair of motors having double armatures connected in driving relation with a common load, a pair of main generators connected to supply electrical energy to each motor having armatures connected alternately in series circuit sandwich relation with the motor armatures and having main and regulating field windings, a pair of exciters having armatures connected alternately with the main field windings of the generators in a common series circuit sandwich relation and having pattern and control field windings connected to be energized from a source of control voltage and in accordance with voltage conditions of the motor circuits, respectively, and a regulating generator having excitation means connected so as to be responsive to the differential between the armature currents of the motors, said regulating generator being connected to energize the regulating windings of the pairs of main generators in opposite senses to maintain a predetermined division of load between the motors.

8. In a control system, a pair of dynamo-electric machines each having an armature and a field winding, and control means connected to energize said field windings including a pair of exciters having field windings energized from a source of substantially constant voltage and erators in a series circuit sandwiched relation for building up the output voltages of the generators 25, 26, and 42, 43. When the voltages across the generators 25 and 42 reach predetermined operating values, the magnetomotive forces of the control field windings 67 and 68 of the regulating exciters 56 and 58 substantially neutralize the magnetomotive forces of the pattern field windings 64 and 65, respectively, so that the self-energizing field windings 61 and 62 maintain the output voltages of the regulating exciters at the values required for obtaining the predetermined values of generator voltages.

While the division of load between the motors 10 and 12 remains in the desired proportions, the magnetomotive forces of the field windings 82 and 83 of the load balancing generator 75 substantially neutralize each other. As soon, however, as the motor 10, for example, assumes or tends to assume more than its proportion of the total load, the field winding 82 will be energized to a greater degree in accordance with the increased armature current of the motor 10. Accordingly, the regulating generator 75 operates to energize the regulating field windings 39 and 40 of the generators 25 and 26 differentially with respect to the main field windings 36 and 37. At the same time, the regulating field windings 53 and 54 are energized cumulatively, with respect to the main field windings 50 and 51, of the generators 42 and 43. Accordingly, the voltages applied to the armatures 16 and 17 of the motor 10 will be reduced, thus reducing the load on the motor 10. At the same time, the voltages applied to the armatures 18 and 19 of the motor 12 are increased, so as to increase the proportion of the load taken by this motor. This condition continues to exist until the loads on the motors 10 and 12 regain the proper proportions, whereupon the effects of the field windings 82 and 83 of the load balancing generator are substantially neutralized, until a subsequent shift of load occurs.

Should the regulating exciter 56 fail, or should it be desired for any reason to remove the exciter 56 from the system, the switch 88 may be operated to its upper operating position. In this position, the armature 59 is disconnected from the circuit and bypassed through contact member 88b, while the energizing circuits for the pattern field winding 64 and the control field winding 67 are interrupted at contact members 88c and 88d to de-energize the exciter 56. Since the field windings 36 and 37 are connected in series circuit relation with the regulating exciter 58 and the field windings 50 and 51, the exciter 58 may be utilized to energize all of the field windings.

Since the exciters in such a control system are usually of sufficient size to provide about 6:1 forcing for the field excitation, the steady state exciter voltage will be only about 1/6 the maximum voltage, which must be available while the generator field is building up. With the exciter 56, for example, removed from the circuit, operation may be readily continued, using only the exciter 58, since this merely slows down the rate of response. Full output of the generators 25, 26, 42 and 43 may be maintained under steady state conditions.

With the motors and generators connected as described, the motor armature 16 and its associated generator armature 30 may be cut out of the circuit by opening the switch 85 and moving the switch 86 to complete a closed circuit for the motor armature 17 and the generator armature 31 through its contact member 86b. Since the generator voltages are substantially the same, and the voltages across the armatures of the motor are also substantially the same, continued operation of the system may be attained using only the armature 17 and the generator 26. It will be realized, of course, that the full load of the armatures 16 and 17 can not be carried by the armature 17 alone, without overloading the armature 17.

When the armature 17 and its generator 26 are operated in closed circuit relation, the control switch 89 should be operated to its lowermost position, whereupon the field winding 82 of the load balance generator 75 will be connected across the compensating field winding 34 of the generator 26 through contact members 89f and 89d. The control field winding 67 of the regulating exciter 56 will now be connected across the armature 31, through contact members 89b and 89d, for regulating the output of the regulating exciter to maintain a predetermined output voltage for the generator 26.

From the above description and accompanying drawing, it will be apparent that I have provided a simple and effective motor control system for a double armature, twin-motor reversing drive. By utilizing a series circuit sandwich relation of the exciter and generator field windings, smaller exciters may be used having smaller time constants. This enables faster build-up of exciter voltage and hence, quicker response of the main generators. The smaller exciters may, in some cases, be operated at higher speeds, thus further reducing the time constants, and the cost of manufacture by using smaller frame sizes.

The safety of the system will be increased, since the maximum voltage to ground or across any part of the exciter circuit is the voltage of one exciter, while the circuit economy corresponding to double the exciter voltage is retained. Since the exciters are usually arranged for about 6:1 field forcing, either exciter may be used by itself for normal operation in case of damage to the other. Since the steady state exciter voltage is only about 1/6 the maximum voltage during forcing, one exciter is easily capable of maintaining full output under steady state conditions. The forcing capacity of the excitation system is the only thing affected, causing a slowing down of the rate of response of the main generators.

Since the exciters are connected in series circuit relation, the necessity for accurate control of their voltages is avoided, and the field windings may be connected in parallel or in series circuit relation as desired. By utilizing the sandwiched arrangement of the motors and generator armatures, the amount of switching apparatus necessary to connect the motors and generators is greatly reduced. Only a single load balancing generator is required for balancing the loads of the two double armature motors, thus providing a much simpler and less expensive system than when the four motor armatures are connected in parallel circuit relation. By utilizing a common load balancing generator in the manner hereinbefore described, the usual heavy differential and cumulative series field windings are eliminated from the generators, greatly simplifying the generator construction, reducing the number of heavy bus connections, and increasing the generator efficiency by elimination of series field losses.

While the system has been described with the generator field windings connected in sandarmatures connected in series circuit relation in alternation with the windings to provide a single excitation circuit to insure balanced excitation of the machines.

ALONZO F. KENYON.

REFERENCES CITED

The following references are of record in the file of this patent:

UNITED STATES PATENTS

| Number | Name | Date |
|---|---|---|
| 2,214,577 | Cook | Sept. 10, 1940 |
| 2,412,933 | Wright et al. | Dec. 17, 1946 |
| 2,451,957 | Kenyon et al. | Oct. 19, 1948 |

FOREIGN PATENTS

| Number | Country | Date |
|---|---|---|
| 321,950 | Germany | July 21, 1918 |
| 264,912 | Great Britain | Jan. 26, 1927 |